United States Patent
Williams et al.

(10) Patent No.: US 8,667,235 B2
(45) Date of Patent: Mar. 4, 2014

(54) DATA DE-DUPLICATION FOR SERIAL-ACCESS STORAGE MEDIA

(75) Inventors: Christopher Williams, Devauden/Chepslow Wales (GB); Gregory Trezise, Wells (GB); Jonathan Peter Buckingham, Bristol (GB); Neil Thomas Hutchon, Bristol (GB); Darren Edward Kent, Bristol (GB); Andrew Hana, Bristol (GB); Peter Walsh, Burnham-on-Sea somerset (GB); Rafel Jibry, Bristol (GB); Robert Morling, Tockington South Gloucestershire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 13/259,739

(22) PCT Filed: Feb. 11, 2010

(86) PCT No.: PCT/US2010/023964
§ 371 (c)(1),
(2), (4) Date: Sep. 23, 2011

(87) PCT Pub. No.: WO2011/099975
PCT Pub. Date: Aug. 18, 2011

(65) Prior Publication Data
US 2012/0047328 A1    Feb. 23, 2012

(51) Int. Cl.
*G06F 12/12*    (2006.01)

(52) U.S. Cl.
USPC ............... 711/161; 711/133; 711/E12.041; 711/E12.07

(58) Field of Classification Search
USPC ............ 711/111, 118, 133, 161, E12.019, 711/E12.069, E12.041, E12.07
See application file for complete search history.

(56) References Cited

U.S. PATENT DOCUMENTS

| | | | |
|---|---|---|---|
| 8,131,924 B1 * | 3/2012 | Frandzel et al. | 711/113 |
| 8,204,862 B1 * | 6/2012 | Paulzagade et al. | 707/679 |
| 8,281,066 B1 * | 10/2012 | Trimmer et al. | 711/103 |
| 2005/0091234 A1 | 4/2005 | Hsu et al. | |
| 2007/0097534 A1 | 5/2007 | Evans et al. | |
| 2007/0255758 A1 * | 11/2007 | Zheng et al. | 707/200 |
| 2009/0013129 A1 * | 1/2009 | Bondurant | 711/115 |
| 2009/0193223 A1 * | 7/2009 | Saliba et al. | 711/216 |
| 2009/0204765 A1 * | 8/2009 | Gupta et al. | 711/133 |
| 2009/0265399 A1 * | 10/2009 | Cannon et al. | 707/205 |
| 2009/0271454 A1 | 10/2009 | Anglin et al. | |
| 2009/0327625 A1 * | 12/2009 | Jaquette et al. | 711/160 |
| 2011/0093664 A1 * | 4/2011 | Leppard | 711/154 |
| 2011/0185149 A1 * | 7/2011 | Gruhl et al. | 711/206 |

OTHER PUBLICATIONS

International Search Report and Written Opionon, dated Nov. 4, 2010, 10 pages.

\* cited by examiner

*Primary Examiner* — Hal Schnee (57) ABSTRACT

Data storage and retrieval methods and apparatus are provided for facilitating data de-duplication for serial-access storage media such as tape. During data storage, input data is divided into a succession of chunks and, for each chunk, a corresponding data item is written to the storage media. The data item comprises the chunk data itself where it is the first occurrence of that data, and otherwise comprises a chunk-data identifier identifying that chunk of subject data. To facilitate reconstruction of the original data on read-back from the storage media a cache (50) is used together with a database (35R), stored on the media, that includes for each duplicated chunk, the location of the corresponding chunk of subject data.

19 Claims, 5 Drawing Sheets

DATA DE-DUPLICATION FOR SERIAL-ACCESS STORAGE MEDIA

BACKGROUND

The present invention relates to methods and apparatus for implementing data de-duplication in respect of serial-access storage media.

Existing storage devices frequently offer data compression (short dictionary type redundancy elimination); for example, LTO (Linear Tape-Open) tape drives may use SLDC (Streaming Lossless Data Compression which is very similar to the Adaptive Lossless Data Compression algorithm). This type of redundancy elimination is not fully efficient when handling large scale data duplications such as frequently found in data supplied to storage devices for backup or archiving; such data often contains copies of files or other large sections of repeated data.

For such large scale redundancy elimination, a class of techniques known as 'data de-duplication' have been developed. In general terms data de-duplication, when applied to the storage of input subject data on a storage medium, involves identifying chunks of repeated data in the input subject data, storing the first occurrence of the chunk data, and for subsequent occurrences of that chunk of data, storing only a pointer to the corresponding stored data chunk. When retrieving the data from the storage medium, it is possible to reconstruct the original data by replacing the chunk pointers read from the storage medium with the corresponding chunk data.

As it is possible for the same data chunk to occur both at or near the beginning of the subject data and at or near the end of the subject data, the chunk data has to be available throughout the recovery of the original data from the storage medium. As a result, data-de-duplication is well suited for use with random access storage media such as disc.

Application of data de-duplication to the storage of data to streaming media (that is, serially-accessed media, such as tape) is not attractive because retrieving the full chunk data from the media upon encountering a stored chunk pointer, requires the media to be repositioned which is inevitably very time consuming. Furthermore, although it would be possible to avoid media repositioning by storing all data chunks read from the media to a random access cache memory for the duration of the recovery operation, this would require a very large, and therefore very expensive, cache memory.

SUMMARY OF THE INVENTION

According to the present invention, there is provided a data storage method and apparatus, for storing data to a serial access medium, as set out in accompanying claims 1 and 13 respectively.

Further according to the present invention, there is provided a method and apparatus for reconstructing a subject data stream from data items read from a serial-access storage medium, as set out in accompanying claims 7 and 17 respectively.

BRIEF DESCRIPTION OF THE DRAWINGS

Embodiments of the invention will now be described, by way of non-limiting example, with reference to the accompanying diagrammatic drawings, in which.

DETAILED DESCRIPTION

Figure 1:
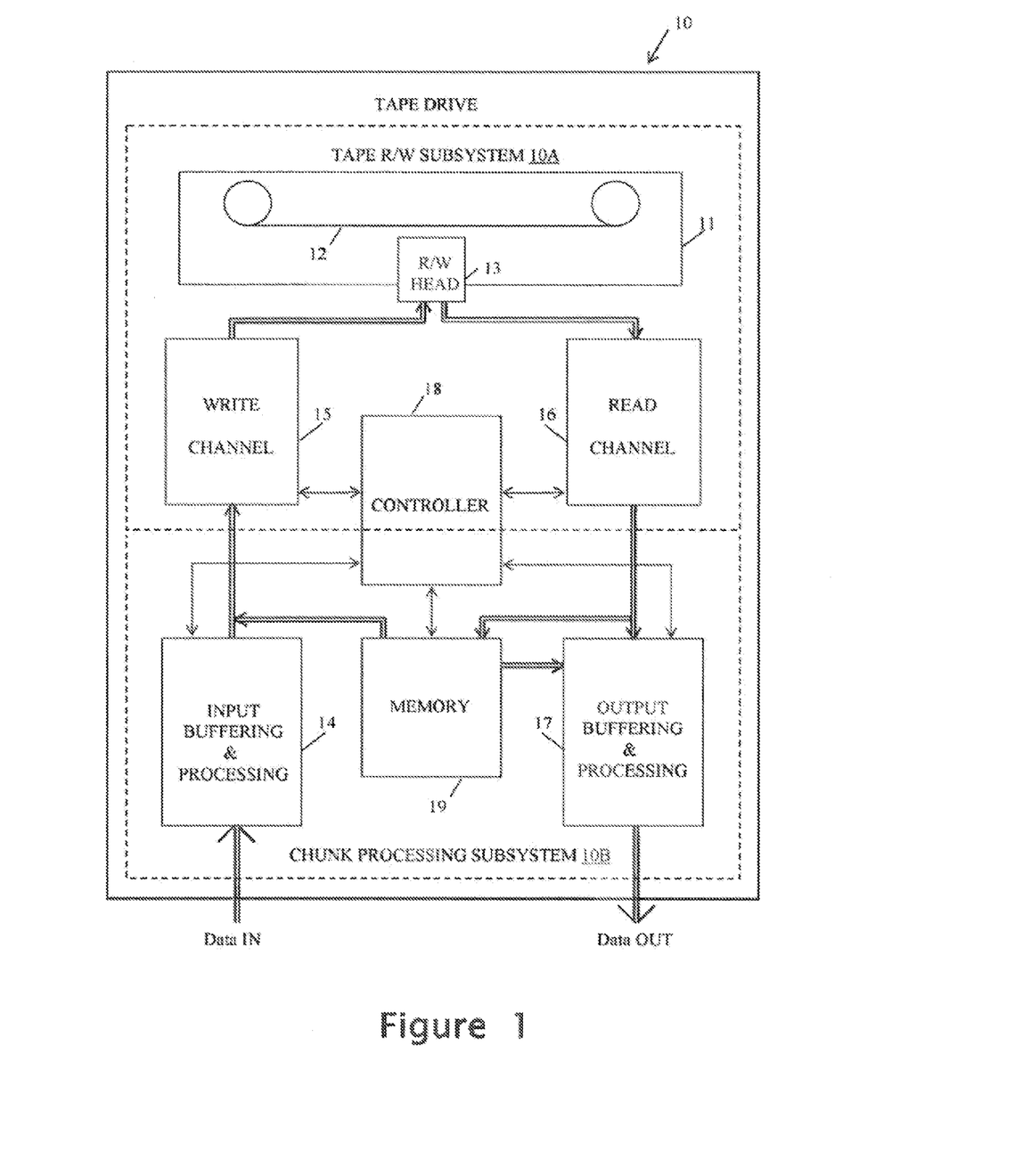
FIG. 1 is a diagram of a tape drive embodying the invention.

FIG. 1 depicts a general functional block diagram of a tape drive unit 10 serving as an example embodiment of apparatus to which the present invention is applicable, for storing data to, and retrieving data from, a serial-access storage medium. The present invention is applicable to any serial-access storage media and is not limited to tape media; another example of a serial-access medium storage device is an optical WORM drive adapted for archival storage. In the present example the tape drive 10 is arranged to use a magnetic recording tape 12 but could alternatively be arranged to use any other type of storage tape, including optical. Furthermore, any recording format can be employed (for example, any linear, serpentine, or helical-scan format).

The tape drive functionally comprises a tape read/write subsystem 10A and a chunk processing subsystem 10B both under the control of a common controller 18 In FIG. 1, the double-lined arrows represent the main data paths between components of the tape drive whereas the single-line arrows represent control paths (it being understood that limited data can be transferred over the latter).

The read/write subsystem 10A comprises a tape transport 11 for moving a storage tape 12 relative to a read/write head 13, a write channel 15 for organizing into the appropriate format data to be supplied to the read/write head 13 for writing to tape, and a read channel 16 for reversing the formatting of data read from tape by the read/write head 13. The write channel 15 will generally also be arranged to effect error correction coding and low-level data compression, with the read channel being correspondingly arranged to effect decompression and error correction.

The chunk processing subsystem 10B provides the input/output interface for the tape drive 10 and is arranged to implement data de-duplication for input subject data to be stored to tape and later retrieved. More particularly, the chunk processing subsystem 10B comprises an input buffering and processing block 14 for receiving and buffering an input subject data stream, dividing it into subject-data chunks, replacing duplicate chunks with references to the corresponding subject data, and passing the chunk first occurrences and chunk references to the write channel 15 for writing to tape;

an output buffering and processing block 17 for receiving subject-data chunks and subject-data references from the read channel 16, reconstructing the original subject data stream from the chunks and references, and outputting the original data; and a memory 19 (for example, flash memory) for holding databases generated as part of the chunking process effected by the block 14 during data storage, and for caching subject-data chunks during data retrieval;

the controller 18 for coordinating the operation of the chunk processing subsystem 10B and effecting various processing tasks to be described hereinafter; typically the controller 18 will be a program-controlled processor arranged to execute program instructions stored in firmware, though some or all of its functionality could alternatively be implemented in hardware.

Figure 4:
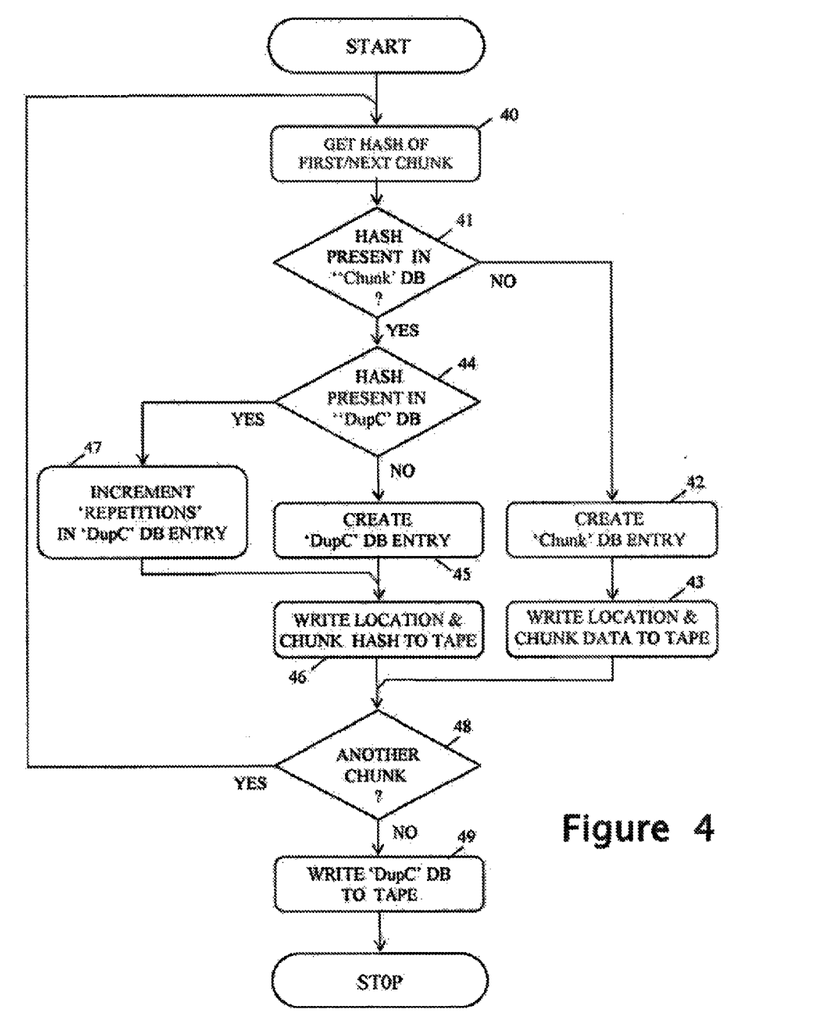
FIG. 4 is a flow chart illustrating the operation of the FIG. 1 tape drive when storing data to tape.
Figure 5:
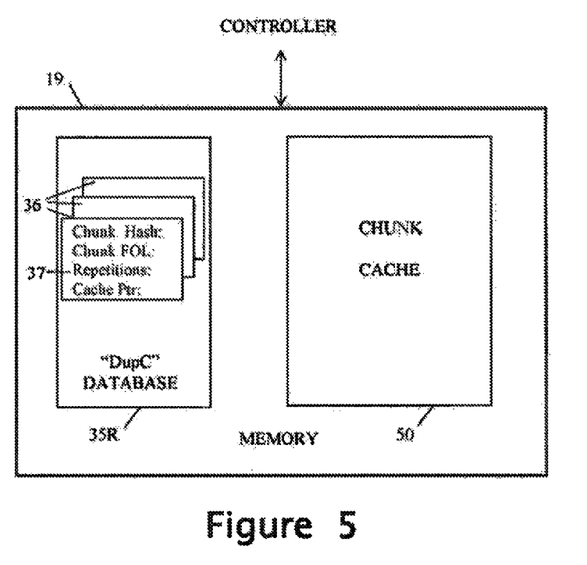
FIG. 5 is a diagram is a diagram illustrating usage of a memory of the FIG. 1 tape drive when recovering data from tape.
Figure 6:
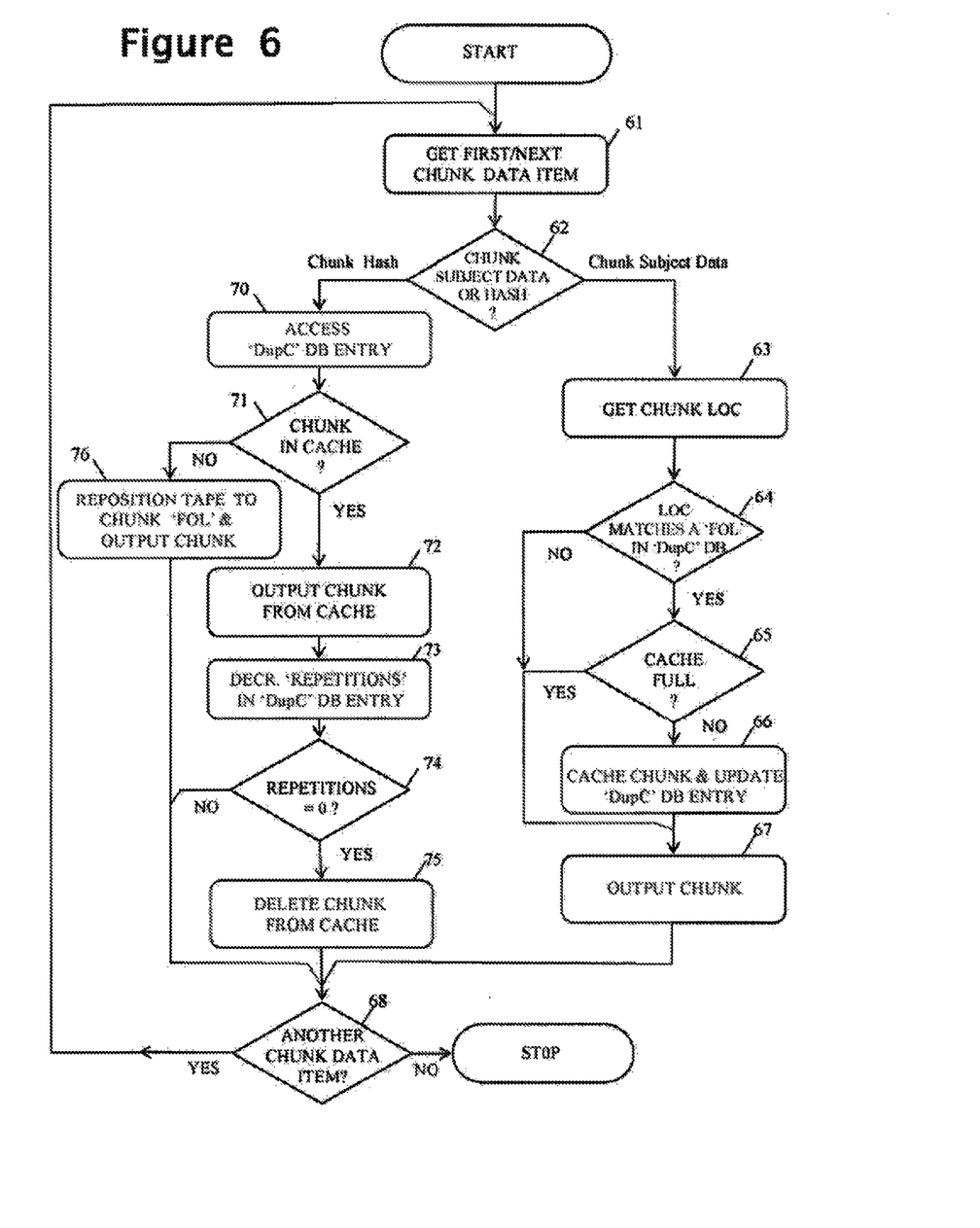
FIG. 6 is a flow chart illustrating the operation of the FIG. 1 tape drive when recovering data from tape.
Figure 7:
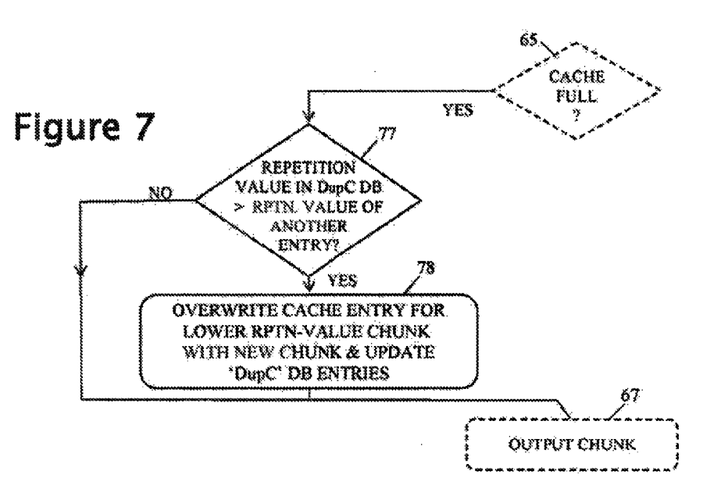
FIG. 7 is a partial flow chart showing a variant of the FIG. 6 flow chart.

The data de-duplication method implemented by the chunk processing subsystem 10B will next be described in detail, first with respect to the processing effected during data storage (FIGS. 2 to 4) and then with respect to the processing effected during data retrieval (FIGS. 5 to 7).

An input subject data stream received at the processing block 14 is divided into chunks (for example 7 KB in size) and a hash of each subject-data chunk is dynamically generated by dedicated hardware circuitry (not separately shown but part of block 14) or any other suitable means. Each hash forms, with very high probability, a unique identifier of the subject data making up the chunk concerned such that chunks giving rise to the same hash value can be reliably considered to comprise the same subject data. In general terms, the chunk subject-data hashes are used to detect duplicate chunks of subject data and each such duplicate chunk is then replaced by its hash. (As used herein, reference to a 'chunk of subject data' is to be understood as a reference to the subject data making up a chunk rather than to the specific chunk concerned). The data output by the processing block 14 to the write channel 15 thus comprises a succession of data items, each data item being either a chunk of subject data where this is the first occurrence of that data as a chunk in the input subject-data stream, or the hash of a chunk where the subject data of the chunk is a duplicate of that of a previously occurring chunk. Each data item (or just selected data items, such as those comprising subject data) may also include metadata about the corresponding chunk, this metadata being placed, for example, at the start of the data item.

Figure 2:
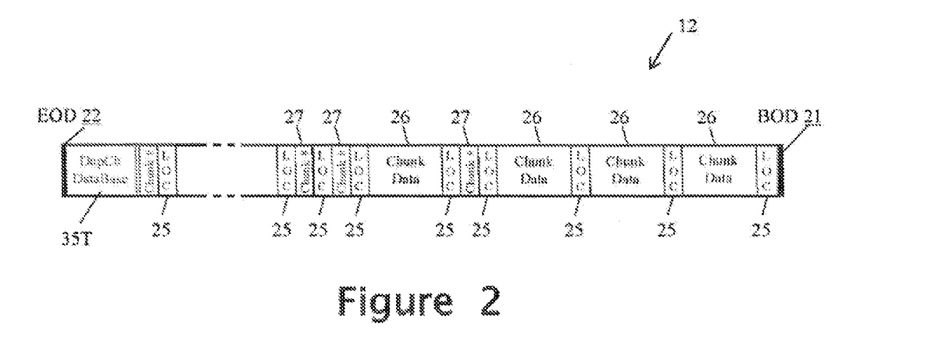
FIG. 2 is a diagram illustrating the general organization of data on a tape written by the FIG. 1 tape drive.

Each chunk in the input subject-data stream has an associated logical location in that data stream and each data item is written to tape along with a location mark allowing a determination to be made of the logical location of the data item in the original data. The general format of the data stored to the tape 12 is thus as shown in FIG. 2 comprising a mixture of chunk-subject-data data items 26 and chunk-hash data items 27 ('chunk #' in FIG. 2) with each data item 26, 27 being associated with a location mark 25. The data stored to tape is, for example, bracketed by Beginning-Of-Data, BOD, and End-Of-Data, EOD, marks 21 and 22 respectively.

The logical location of a chunk in the input data stream, and thus of the corresponding data item stored to tape, is for example expressed by the serial number of the chunk either within the whole input subject data being stored or within a sub-unit, such as a record, of that data—in the latter case, the full logical location of a chunk would also require a sub-unit identifier, such as a record serial number, as well as the chunk serial number. The logical location (hereinafter just 'location') of each chunk of the input subject data provides a unique identifier of the chunk and is tracked by the processing block 14 (or alternatively by the controller 18).

The location marks 25 written to tape can comprise the absolute location of the corresponding data items, relative (in particular, incremental) location indicators, or a mixture of the two. For example, the location marks 25 can comprise a standard codeword or other boundary indicator marking the start of a new data item 26, 27 and constituting an incremental location indicator. Where incremental location indicators are used, absolute location can be determined by counting the incremental location indicators from a previous absolute location (either an absolute location mark or some other absolute mark such as the BOD mark 21).

Each location mark 25 may also provide an indication of whether the following data item is a chunk-subject-data data item 26 or a chunk-hash data item 27.

During the course of chunk processing by block 14, two databases 31, 35 (see FIG. 3) are constructed in the memory 19; as used herein, the term 'database' is to be understood broadly as any searchable organization of data for associating related sets of data elements. The database 31, herein called the 'Chunk' database, is used in the detection of duplicate chunks of subject data during data storage, whereas the database 35, herein called the 'DupC' database, contains information about duplicated chunks and is stored to the tape at the end of the chunking process for use during data retrieval (see FIG. 2) To distinguish between the instantiations of the DupC DB created during the data storage process, written to tape, and used during data retrieval, in the following description the general reference 35 for this database is supplemented by the letter S, T or R as appropriate (S for the storage process instance, T for the instance stored to tape, and R for the instance used during data retrieval).

Figure 3:
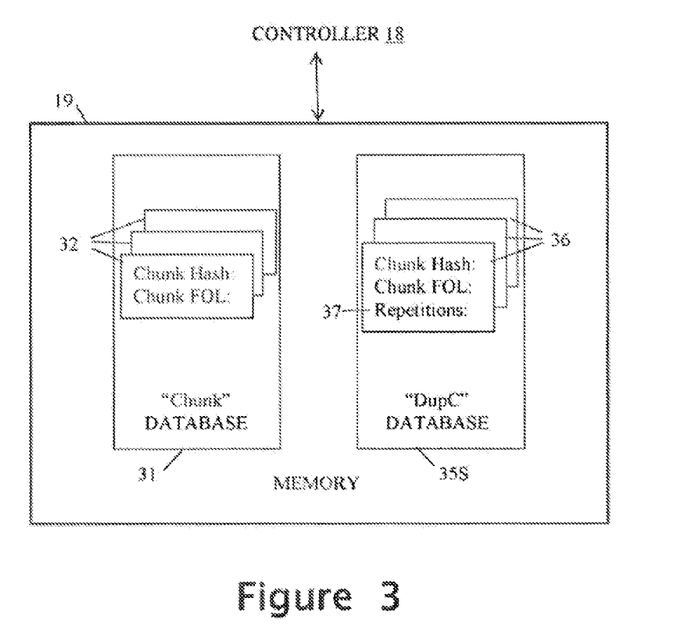
FIG. 3 is a diagram illustrating usage of a memory of the FIG. 1 tape drive when storing data to tape.

The Chunk database 31 comprises a respective multi-field entry 32 for each unique chunk of subject data encountered in the input subject-data stream, each entry 32 comprising a field storing the hash of the chunk of subject data and a field storing the location of the first occurrence of a chunk comprising that subject data (this location being abbreviated herein to 'FOL'—First Occurrence Location). The DupC database 35 comprises a respective multi-field entry 36 for each chunk of subject data duplicated one or more times in the input subject-data stream, each entry 36 comprising a field storing the hash of the chunk of subject data, a field storing the first occurrence location, FOL, of a chunk comprising that subject data, and the number of repetitions (duplicates) 37 of the chunk subject data concerned (or a related indicator such as the total number of occurrences of the chunk, this of course being one more than the number of repetitions).

The process carried out by the chunk processing subsystem 10B during data storage is depicted in the flow chart of FIG. 4 and comprises the following steps:

Step 40 Each chunk of the input subject data stream is taken in turn and the hash of the chunk subject data is formed.

Step 41 A determination is made as to whether the chunk of subject data has been previously encountered by looking for an entry in the Chunk DB 31 with the same chunk hash.

Step 42 If no matching entry is found in the Chunk DB in step 41, the chunk being processed is the first occurrence of the chunk subject data in the input subject data and a corresponding new entry 32 (comprising the chunk hash and location) is made in the Chunk DB 31.

Step 43 After a new entry is made in the Chunk DB in step 42, the chunk is passed to the write channel 15 to be written to tape with an associated location mark.

Steps 48,49 After step 43, if there is another chunk of input subject data, processing returns to step 40, otherwise processing terminates after the DupC DB 35 is passed to the write channel 15 for storage on the tape 13 (this could be, for example, in a separate partition).

Step 44 If in step 41, the hash of the chunk being processed is found in the Chunk DB 31, this indicates that the chunk is a duplicate and processing proceeds to step 44 where a check is made to see if a corresponding entry 36 already exists in the DupC DB 35S

Step 45 The failure to find a matching entry in the DupC DB in step 44 indicates that the chunk being processed is the first duplicate of the chunk subject data and a corresponding new entry (comprising the chunk hash, the FOL of the chunk as recorded in the Chunk DB, and a repetition count value of "1") is created in the DupC DB 35S.

Step 46 Following step 45, the chunk hash is passed to the write channel 15 to be written to tape with an associated location mark, after which step 48 is executed.

Step 47 If a matching entry is found in the DupC DB in step 44 indicating that the chunk being processed is the second or higher duplicate encountered, the repetition count in the DupC DB entry is incremented to keep track of the number of repetitions of the chunk concerned so far encountered in the input subject data. Thereafter processing continues at step 46 to write the chunk hash to tape.

At the end of processing in accordance with the FIG. 4 flow chart, the de-duplicated input subject data has been written to tape as a series of data items 26, 27 with associated location marks 25; the DupC DB 35T has also been stored to the tape giving for each duplicated chunk, the location of the corresponding subject data and the number of repetitions of the chunk of subject data in the original input.

The copies of the Chunk DB 31 and DupC DB 35S present in the memory 19 are deleted once the FIG. 4 processing has been completed.

With regard to the required size or the memory 19, if every entry in the Chunk DB 31 takes up 32 bytes, then for a 1TB tape and a 7 KB chunk size (giving approximately $1.5 \times 10^8$ chunks) up to $5 \times 10^9$ bytes of memory are needed for the Chunk DB. Assuming a similar number of bytes per entry, the size of the DupC 35 may range from zero (no duplicates) to that of the Chunk DB 31 (every chunk duplicated once); the total space required for both DBs is still, however, around $5 \times 10^9$ bytes.

Processing effected during data retrieval (read-back from tape 13) will now be described with reference to FIGS. 5 to 7. First, the DupC DB 35T is read from the tape and put in the memory 19 (see reference 35R in FIG. 5). The DupC DB 35R will typically occupy 20-50% of the memory, leaving a few GB free for use as a cache 50 for chunk subject data read from tape. In the present embodiment, each entry 36 in the DupC DB 35R includes a field for a cache pointer to indicate where in the cache 50 subject data can be found corresponding to the chunk hash of the entry. This pointer field is initially null and can be added into the database entries as the DupC DB is written to the memory from tape or can be included at the outset in the instance of the DupC DB created during data storage.

The data items 26, 27 are then read in turn from the tape 13 and their respective locations are tracked based on the associated location marks 25. The processing of each data item 26, 27 by the chunk processing subsystem 10B to reconstruct the original subject data stream is depicted in the flow chart of FIG. 6 and comprises the following steps:

Step 61 Each chunk data item read from tape is taken in turn and processed.

Step 62 The nature of the data item is determined (for example by its length or from the preceding location mark 25 where this mark provides an indication of the nature of the following data item) and depending on whether the data item is a chunk of subject data or just a chunk hash, processing continues with step 63 or step 64 respectively.

Step 63 The location of the data item (a chunk of subject data) is obtained and processing proceeds at step 64.

Step 64 The DupC DB 35R is searched for an entry having a FOL (First Occurrence Location) matching the location of the data item A match will, of course, only be found if the chunk constituted by the data item is one that is duplicated in the original data.

Step 65 Where a match is found in step 64, then the chunk subject data should be cached for later access but first a check is made as to whether the cache 50 is full.

Step 66 Provided the cache is not full, the chunk subject data is cached and a pointer to the cached data is added into the corresponding entry in the DupC DB 35R.

Step 67 If no match was found in step 64, or if the cache was found to be full in step 65, or after caching in step 66, the chunk subject data is output.

Step 68 After step 67, if there is another data item, processing returns to step 61, otherwise processing terminates.

Steps 70,71 If a data item is determined to be a chunk hash in step 62 indicating a duplicate of a preceding subject-data chunk, then steps 70 and 71 are executed to access the corresponding entry in the DupC DB 35R and read the cache pointer field. If this field is null (indicating that the corresponding chunk subject data is not in the cache 50), processing continues with step 76; otherwise (chunk subject data in cache at the address indicated by the pointer value) processing continues with step 72.

Step 76 As the subject data corresponding to the chunk hash is not in the cache, it must be retrieved from the tape by repositioning the tape to the logical location of the chunk subject data (this location being the FOL in the DupC DB entry accessed in step 70). Once the tape has been appropriately repositioned, the chunk subject data is read off and output; thereafter the tape is returned to the location of the next data item to be read.

Step 72 The subject data corresponding to the chunk hash is read from the cache 50 and output; processing continues at step 73.

Step 73 The repetition count value in the DupC DB entry for the chunk hash is decremented so that this count value indicates how many repeats of the chunk concerned have yet to be encountered. Processing continues at step 74.

Steps 74,75 The repetition count value is checked to sec if it has reached zero and if so, the corresponding chunk subject data is deleted from the cache 50 (or marked as deleted or available for overwriting) thereby freeing up a corresponding amount of cache space; the cache pointer in the corresponding DupC DB entry is also reset to null. If the repetitions count value has not reached zero, the chunk subject data is left in the cache 50 as a further duplicate is yet to be encountered. Processing then continues at step 68.

At the end of processing in accordance with the FIG. 6 flow chart, the reconstructed subject data has been output and the cache 50 emptied; the DupC DB 35R can now also be removed from the memory 19.

FIG. 7 depicts an optimization of the FIG. 6 process in the situation that the cache 50 is found to be full in step 65. Rather than simply not caching the subject data of the chunk data item being processed, a check is made (see step 77 in FIG. 7) as to whether there is a greater number of duplicates to come of the chunk data item being processed than for another chunk of subject data already cached (which may only needed to be duplicated in the output one more time, for example). This check is carried out by looking up the repetition count value 37 in the DupC DB 35R for the chunk data item being processed, and then searching the database for any entry for a cached chunk (indicated by a non null cache pointer) having a lower repetition count value. Where such an entry is found, the cached subject data of the chunk concerned is overwritten with the subject data of the chunk data item being processed (step 78) and the entries in the DupC DB for the overwritten chunk and the chunk data item being processed are updated accordingly.

A number of general variants are possible to the above-described embodiment of the invention. For example, in the foregoing the hash of a chunk's subject data has been used as an identifier of the subject data making up that chunk (this identifier is hereinafter referred to as the 'chunk-data identifier' or chunk-data ID'). Note that the chunk-data ID is an identifier of the subject data making up a chunk and not an identification of a specific chunk that comprises that data—such a chunk-specific identification is provided by its logical location. Alternatives to using the hash of the subject data of a chunk as the chunk-data identifier are possible, for example:

- in the Chunk DB 31, rather than using the chunk hash as the chunk-data ID, any chunk subject-data signature could be used (that is, any unique measure derivable from the subject data itself, a hash merely being one example); and/or
- on tape and in the DupC DB 35, the chunk hash can be replaced by any unique ID since the Chunk DB 31 can be used to provide an association between a chunk of subject data and this ID. This chunk-data ID could, of course, be a chunk signature but could alternatively be the record number of the entry for the chunk of subject data in the Chunk DB or the First Occurrence Location FOL of the chunk of subject data (in this latter case, the fields for chunk-data ID and FOL in the entry are one and the same). Different forms of chunk-data IDs can be used in the Chunk DB 31 on the one hand, and on tape and in the DupC DB 35 on the other hand.

In another variant, instead of recording the number of repetitions 37 of each duplicated chunk of subject data in the DupC DB 35 and decrementing this value as each duplication of the chunk is encountered on read-back to determine when the cached chunk subject matter is no longer needed, it would alternatively be possible to record in the DupC DB 35 the Last Occurrence Location (LOL) of the chunk of subject data in the original subject matter, this being simply done during data storage by recording in the DupC DB entry for each duplicated chunk, the logical location of each duplicate of the chunk as it is encountered, the latest such location overwriting an earlier one. During read-back, the Last Occurrence Location (LOL) data for a DupC DB entry would not need updating each time a copy of the related chunk of subject data was output from the cache 50, it simply being necessary to determine when the LOL data matches the location of the current chunk-ID data item 27 (since no further duplication of the chunk data will thereafter required, the corresponding cache space can be freed up). It should, however, be noted that use of Last Occurrence Location (LOL) data rather than repetitions data to judge when a particular chunk of subject data can be removed from the cache, means that the FIG. 7 optimization cannot be implemented. The Last Occurrence Location (LOL) data and the repetitions data can be considered to be examples of 'last occurrence data' for enabling a determination to be made, on read-back of the storage media, of whether a data item comprising a chunk-data ID represents the last occurrence of the corresponding chunk of subject data in the original subject data.

With regard to reconstruction of the subject data during read-back (FIG. 6), the following variants, additional to that already described with respect to FIG. 7, can be implemented:

In the example method illustrated in FIG. 6, determining whether a chunk data item 26 is recorded as a duplicated chunk in the DupC DB 35 is done by using the location of the data item (step 64); however, where the chunk-data ID recorded in the DupC DB 35R is derived from the chunk subject data, then it is alternatively possible to regenerate the chunk-data ID from the chunk and check for the presence of this chunk-data ID in DupC DB 35R. A further alternative is to include with each chunk data item 26 the corresponding chunk-data ID as metadata; this chunk-data ID can then be used to determine whether a corresponding entry exists in the DupC DB 35R.

In the example method illustrated in FIG. 6, determining whether a chunk corresponding to a particular chunk-data ID is in the cache 50, is done by looking in the DupC DB 35R (steps 71, 72); however, where the chunk-data ID is its location or is a chunk signature, it is alternatively possible to use a separate table associating chunk-data ID with cache location, this table being dynamically constructed as each duplicated chunk is cached. Alternatively, If the cache was organised so as chunks were cached, they went into memory in a handy sequential order, they could be indexed when needed by their sequential (count) position; this sequential position is known at the time the subject data is being stored to tape and can be recorded in the DupC database thereby facilitating access to the appropriate chunk during data retrieval (indeed, the entries in the DupC database are created in the order the chunks will be cached).

The cache can be implemented off the tape drive, for example in memory of a host computer.

It will he appreciated that the operations of data storage and data retrieval may be carried out by different tape drives 10 and, indeed, can be carried out by separate, dedicated, pieces of equipment rather than using equipment that performs both functions.

It will also be appreciated that the size of the chunks need not be constant but can be varied during the course of data storage to better suit characteristics of the subject data being stored.

It is also possible to provide embodiments of the methods and apparatus of the invention in which the DupC database 35 does not include last occurrence data (such as a repetitions indicator or LUL), each entry in the database simply serving to link a chunk-data ID with the FOL of the corresponding subject data. The DupC database is then used during data retrieval to indicate where non-cached chunks of subject data can he located on tape. Where data retrieval starts from BOD (Beginning Of Data), it would, of course, he possible to dynamically build up a table associating each chunk-data ID with the corresponding FOL (provided the chunk-data ID of a chunk of subject data was either derivable from the subject data or stored as metadata with the corresponding data item). However, the use of the DupC database is both more efficient (since it only contains entries for duplicated chunks), and allows data retrieval to be started part way through the stored data (though this would in all probability give rise to a greater number of tape repositionings than if retrieval had been started from BOD).

Although as described, the DupC database 35 only contains entries in respect of duplicated chunks, it may in fact contain an entry for every chunk (for example, for holding metadata of interest); however, this would take up extra memory space and in that respect is not efficient.

The invention claimed is:

1. A data storage method comprising:
dividing input subject data into a succession of subject data chunks, each chunk comprising chunk subject data;
for each chunk, writing a corresponding data item in a serial-access storage medium in association with a logical location mark, the corresponding data item comprising the chunk subject data where the chunk subject data is a first occurrence of the chunk subject data as a chunk of the input subject data, and otherwise the corresponding data item comprising a chunk-data identifier identifying the chunk subject data;
generating a chunk database and a duplicated-chunk database; wherein
the chunk database comprises a multi-field entry for each unique chunk in the input subject data; and
the duplicated-chunk database comprises an entry for each chunk that is duplicated one or more times in the input subject data, each entry comprising a corresponding chunk-data identifier which is a signature specific to the chunk subject data and a logical location indicator indicative of a first occurrence location of the chunk subject data; and
writing the duplicated-chunk database to the serial-access storage medium.

2. A method according to claim 1, wherein for each chunk of the duplicated subject data in the input subject data, the duplicated-chunk database further associates with the corresponding chunk-data identifier last-occurrence data for enabling a determination to be made, on read-back of the serial-access storage medium, whether the data item comprising the chunk-data identifier identifying the chunk subject data represents a last occurrence of the subject data chunks comprising the chunk subject data.

3. A method according to claim 1, wherein generation of the duplicated-chunk database is by:
checking in turn each chunk of the succession of subject data chunks to determine if the chunk subject data duplicates chunk subject data of an earlier chunk and, if so, whether an entry already exists in the duplicated-chunk database for the chunk subject data; and
where the chunk subject data is determined to be a duplicate for which no corresponding entry exists in the duplicated-chunk database, creating a new entry in the duplicated-chunk database for the chunk subject data,
where the chunk subject data is determined to be a duplicate for which a corresponding entry already exists in the duplicated-chunk database, updating last occurrence data for the corresponding entry.

4. A method according to claim 1, further comprising determining, for each chunk, whether the chunk subject data duplicates that of an earlier chunk by:
forming from the chunk subject data the chunk signature specific to the chunk subject data; and
checking for the presence of the chunk signature in the entries in the duplicated-chunk database, wherein absence of the chunk signature in the duplicated-chunk database results in the creation of a new entry in the duplicated-chunk database, the new entry associating the chunk signature with the logical location indicator.

5. A method according to claim 2, wherein for each chunk of duplicated subject data in the input subject data, the last-occurrence data in the duplicated-chunk database comprises one of:
a repetition indicator indicating how many times the chunk subject data has been encountered in the input subject data; and
a logical location indicator of a last data item comprising the chunk-data identifier.

6. A method according to claim 1, wherein each chunk-data identifier written to the serial-access storage medium and stored in the duplicated-chunk database is one of:
a chunk signature formed from corresponding chunk subject data, the chunk signature specific to the corresponding chunk subject data and
a logical location of a first occurrence of the corresponding chunk subject data.

7. A method for reconstructing a subject data stream from data read from a serial-access storage medium storing a succession of data items each associated with a logical location mark, each data item being one of a chunk of subject data and a chunk-data identifier identifying a chunk of subject data, the serial-access storage medium further storing a duplicated-chunk database associating each chunk-data identifier stored on the serial-access storage medium with a logical location of one of the data items comprising subject data identified by the chunk-data identifier, the method comprising reading the serial-access storage medium and, for each data item encountered:
where the data item is a chunk of subject data:
determining whether a corresponding entry exists in the duplicated-chunk database, and if so, storing the chunk to a cache memory unless the cache memory is full, and
outputting the chunk;
where the data item is a chunk-data identifier, determining whether corresponding subject data is present in the cache memory, and
where the corresponding subject data is determined to be present in the cache memory, outputting the corresponding subject data;
otherwise, retrieving the corresponding subject data from the serial-access storage medium based on the logical location stored in an entry for the chunk-data identifier in the duplicated-chunk database, and outputting the retrieved corresponding subject data.

8. A method according to claim 7, wherein:
the duplicated-chunk database further associates last-occurrence data with each chunk-data identifier stored on the serial-access storage medium; and
where, for a data item that is a chunk-data identifier, it is determined that the corresponding subject data is present in the cache memory, determining from the last-occurrence data associated with the chunk-data identifier in duplicated-chunk database, whether the cached subject data will be needed again and, if not, freeing up cache memory space.

9. A method according to claim 7, wherein retrieving subject data corresponding to a particular chunk-data identifier from the serial-access storage medium, includes accessing the duplicated-chunk database to determine a logical location associated with the chunk-data identifier, and repositioning the serial-access storage medium to the logical location associated with the chunk-data identifier.

10. A method according to claim 8, wherein for each chunk-data identifier in the duplicated-chunk database, the last-occurrence data comprises one of:
a repetition indicator indicating how many times, out of a total number of occurrences of a corresponding chunk of subject data, the corresponding chunk of subject data has not been output, the repetition indicator being decremented each time the corresponding chunk of subject data is output from the cache memory; and
an indicator of a logical location of a last data item comprising the chunk-data identifier.

11. A method according to claim 7, wherein each chunk-data identifier stored on the serial-access storage medium as a data item and stored in the duplicated-chunk database is one of:
  a chunk signature formed from the chunk subject data and specific to the chunk subject data; and
  a logical location of a first occurrence of the corresponding chunk of subject data.

12. A method according to claim 8, wherein for each chunk-data identifier in the duplicated-chunk database, the last-occurrence data comprises a repetition indicator indicating how many times, out of a total number of occurrences of a corresponding chunk of subject data, the corresponding chunk of subject data was not output; and wherein, in the event of the cache memory being full when a chunk of subject data is to be stored to it, a determination is made using the duplicated-chunk database whether the repetition indicator for a current chunk of subject data has a larger value than that of another chunk of subject data already in the cache memory, and if so, the another chunk of subject data in cache memory is overwritten with the current chunk of subject data.

13. A data storage apparatus comprising:
  a write subsystem for writing data to a serial-access storage medium, and
  a chunk-processing subsystem for dividing input subject data into a succession of subject data chinks, each chunk comprising chunk subject data, and operative, for each subject data chunk, to cause the write subsystem to write to the serial-access storage medium a data item in association with a logical location mark, the data item comprising the chunk subject data, where the chunk subject data is the first occurrence, as a chunk of the input subject data, and otherwise comprising a chunk data identifier identifying the chunk subject data;
  the chunk-processing subsystem being further operative to:
  generate a chunk database and a duplicated-chunk database; wherein
    the chunk database comprises a multi-field entry for each unique chunk in the input subject data; and
    the duplicated-chunk database comprises an entry for each chunk that is duplicated one or more times in the input subject data, each entry comprising a corresponding chunk-data identifier which is a signature specific to the chunk subject data and a logical location indicator indicative of a first occurrence location of the chunk subject data; and
  write the duplicated-chunk database to the serial-access storage medium.

14. The data storage apparatus according to claim 13, wherein the chunk-processing subsystem is configured to generate the duplicated-chunk database to further associate with a chunk-data identifier corresponding to each chunk of subject data duplicated in the input subject data, last-occurrence data enabling a determination to be made, on read-back of the serial-access storage medium, of whether a data item comprising the chunk-data identifier represents a last occurrence of a chunk.

15. The data storage apparatus according to claim 14, wherein the chunk-processing subsystem is configured to generate the duplicated-chunk database by:
  checking in turn each chunk of the succession of subject-data chunks to determine if the checked chunk duplicates an earlier chunk and, if so, whether an entry already exists in the duplicated-chunk database for the checked chunk; and
  where the checked chunk is determined to be a duplicate for which no corresponding entry exists in the duplicated-chunk database, creating a new entry in the duplicated-chunk database for the checked chunk,
  where the checked chunk is determined to be a duplicate for which a corresponding entry already exists in the duplicated-chunk database, updating the last-occurrence data for the corresponding entry.

16. The data storage apparatus according to claim 14, wherein the chunk-processing subsystem is configured to determine whether chunk subject data duplicates that of an earlier chunk by:
  forming from the chunk subject data, the chunk signature specific to the chunk subject data; and
  checking for the presence of the chunk signature in entries in the duplicated-chunk database, absence of the signature in the duplicated-chunk database resulting in the chunk-processing subsystem creating a new entry in the duplicated-chunk database associating the chunk signature with the logical location indicator.

17. An apparatus for reconstructing a subject data stream from data read from a serial-access storage medium storing a succession of data items each associated with a logical location mark, each data item being one of chunk subject data and a chunk-data identifier identifying the chunk subject data, the serial-access storage medium further storing a duplicated-chunk database associating each chunk-data identifier stored on the serial-access storage medium with a logical location of a data item comprising the chunk subject data, the apparatus comprising:
  a read subsystem for reading data from the serial-access storage medium, and
  a chunk-processing subsystem, including a cache memory;
  the chunk-processing subsystem configured to:
  determine, for each data item read from the serial-access storage medium, whether it is a chunk of subject data or a chunk-data identifier; and
  where the data item is a chunk of subject data:
  determine whether a corresponding entry exists in the duplicated-chunk database, and if so, store the chunk subject data to the cache memory, and
  output the chunk subject data;
  where the data item is a chunk-data identifier, determine whether corresponding chunk subject data is present in the cache memory, and:
  where the corresponding chunk subject data is determined to be present in the cache memory, output the corresponding chunk subject data; and
  otherwise, retrieve the corresponding chunk subject data from the serial-access storage medium on the basis of the logical location stored in an entry for the chunk-data identifier in the duplicated-chunk database, and output the retrieved chunk subject data.

18. An apparatus according to claim 17, wherein the duplicated-chunk database further associates last-occurrence data with each chunk-data identifier stored on the serial-access storage medium; and
  for a data item that is a chunk-data identifier, when the chunk-processing subsystem determines that the corresponding subject data is present in the cache memory, the chunk-processing subsystem determines from the last-occurrence data associated with the chunk-data identifier in the duplicated-chunk database whether the cached corresponding subject data will be needed again and, if not, frees up cache memory space corresponding with the cached corresponding subject data.

19. An apparatus according to claim 18, wherein for each chunk-data identifier in the duplicated-chunk database, the corresponding last-occurrence data comprises a repetition indicator indicating how many times, out of a total number of occurrences of a corresponding chunk of subject data, the corresponding chunk of subject data was not output; and wherein, in the event of the cache memory being full when a chunk is to be stored to it, the chunk-processing subsystem is arranged to determine, using the duplicated-chunk database, whether the repetition indicator for a current chunk of subject data has a larger value than that of another chunk of subject data already in the cache memory, and in this case to overwrite the another chunk of subject data in the cache memory with the current chunk of subject data.

* * * * *

UNITED STATES PATENT AND TRADEMARK OFFICE
CERTIFICATE OF CORRECTION

| | | |
|---|---|---|
| PATENT NO. | : 8,667,235 B2 | Page 1 of 1 |
| APPLICATION NO. | : 13/259739 | |
| DATED | : March 4, 2014 | |
| INVENTOR(S) | : Williams et al. | |

It is certified that error appears in the above-identified patent and that said Letters Patent is hereby corrected as shown below:

In the Claims

Column 9, line 29, in Claim 2, delete "identifier" and insert -- identifier, --, therefor.

Column 10, line 8, in Claim 6, delete "data" and insert -- data; --, therefor.

Column 11, line 27, in Claim 13, delete "chinks," and insert -- chunks, --, therefor.

Signed and Sealed this
Seventeenth Day of June, 2014

Michelle K. Lee
*Deputy Director of the United States Patent and Trademark Office*